US011327054B2

(12) United States Patent
Gu et al.

(10) Patent No.: US 11,327,054 B2
(45) Date of Patent: May 10, 2022

(54) SYSTEM FOR DETERMINING EXCITATION FREQUENCY OF VIBRATORY STRESS RELIEF AND METHOD THEREFOR

(71) Applicant: Shanghai Maritime University, Shanghai (CN)

(72) Inventors: Bangping Gu, Shanghai (CN); Siqi Wang, Shanghai (CN); Zhenwu Yan, Shanghai (CN); Wei Wei, Shanghai (CN); Xiong Hu, Shanghai (CN); Jintao Lai, Shanghai (CN)

( * ) Notice: Subject to any disclaimer, the term of this patent is extended or adjusted under 35 U.S.C. 154(b) by 405 days.

(21) Appl. No.: 16/562,692

(22) Filed: Sep. 6, 2019

(65) Prior Publication Data

US 2020/0080975 A1   Mar. 12, 2020

(51) Int. Cl.
| | |
|---|---|
| *G01N 29/46* | (2006.01) |
| *G01N 29/12* | (2006.01) |
| *G01N 29/44* | (2006.01) |
| *G05B 13/04* | (2006.01) |

(52) U.S. Cl.
CPC ............ *G01N 29/46* (2013.01); *G01N 29/12* (2013.01); *G01N 29/4472* (2013.01); *G05B 13/04* (2013.01); *G01N 2291/014* (2013.01); *G01N 2291/263* (2013.01)

(58) Field of Classification Search
CPC .... G01N 29/46; G01N 29/12; G01N 29/4472; G01N 2291/014; G01N 2291/263; G05B 13/04
See application file for complete search history.

(56) References Cited

U.S. PATENT DOCUMENTS 4,968,359 A * 11/1990 Hebel, Jr. .............. C21D 10/00
148/558

FOREIGN PATENT DOCUMENTS

| CN | 105506267 A |   | 4/2016 |
|---|---|---|---|
| CN | 105543469 A | * | 5/2016 |
| CN | 108018414 A | * | 5/2018 |

(Continued)

OTHER PUBLICATIONS

Prevey, "X-Ray Diffraction Residual Stress Techniques" American Society for Metals, 1986 (Year: 1986).*

(Continued)

*Primary Examiner* — John C Kuan
(74) *Attorney, Agent, or Firm* — Lei Jiang; Lei Jiang LLC

(57) ABSTRACT

A method for determining the excitation frequency of vibratory stress relief by employing a system for determining the excitation frequency of vibratory stress relief is disclosed, comprising the steps of: connecting the component to the system for determining excitation frequency of vibratory stress relief; selecting a group of preferred excitation frequency of the vibratory stress relief according to the results of numerical simulation; obtaining the reference voltage peak of the sinusoidal signal from the preferred excitation frequency, and transforming the sinusoidal signal into an excitation signal for vibratory stress relief treatment; converting the vibration signal of the component during vibratory stress relief treatment into voltage signal to obtain the actual voltage peak; comparing the actual voltage peak with the reference voltage peak, and selecting the frequency with the maximum difference of voltage peak as the excitation frequency for the vibratory stress relief treatment.

3 Claims, 5 Drawing Sheets

(56) References Cited

FOREIGN PATENT DOCUMENTS

| CN | 108130413 A | | 6/2018 |
|----|-------------|---|--------|
| CN | 108456772 A | * | 8/2018 |

OTHER PUBLICATIONS

Yang, "Understanding of Vibration Stress Relief with Computation Modeling" Journal of Materials Engineering and Performance, vol. 18, Oct. 2009 (Year: 2009).*

* cited by examiner

SYSTEM FOR DETERMINING EXCITATION FREQUENCY OF VIBRATORY STRESS RELIEF AND METHOD THEREFOR

The present application claims priority benefit of CN 109321743A, filed on Sep. 10, 2018, the entirety of which being incorporated by reference herein.

FIELD OF INVENTION

The present invention relates to the field of vibratory stress relief technology, and relates in particular to a system for determining the excitation frequency of vibratory stress relief and a method therefor.

BACKGROUND ART

Elimination of residual stress of components induced by manufacturing processes is an important topic in the field of mechanical manufacturing industry. Vibratory stress relief technology has the characteristics of good processing effect, short processing time, less environmental pollution, low energy consumption and easiness to perform operation on site. It is a high efficiency, energy-saving and environmental protection stress relief technology. Therefore, research on vibratory stress relief technology has important engineering application value. At present, the widely used vibratory stress relief system of prior art adopts the traditional sweeping frequency method to determine the excitation frequency of vibratory stress relief, without taking into account the residual stress distribution state of the component. The Chinese patent with the application number 201710166184.2 employs the afore-mentioned sweeping frequency method on vibratory stress relief for steel beams of steel structural bridges. The excitation frequency of vibratory stress relief determined by such a sweeping frequency method is not conducive to achieving an ideal effect of vibratory stress relief on eliminating residual stress.

In addition, the sweeping frequency method employs sweeping frequency vibration to find the natural frequency of the component, and then a frequency in its natural frequency or in its sub-resonance region is selected for vibratory stress relief treatment of the component. However, the excitation frequency of vibratory stress relief of the component determined by the sweeping frequency vibration is more than often multiple. How to select a suitable excitation frequency of vibratory stress relief from the multiple frequencies has become an urgent problem to be solved in the research field of vibratory stress relief process parameters. The multi-frequency coupled vibratory stress relief system and method of the Chinese patent with the application number 201510992080.8 discloses a technique of multi-frequency coupled vibratory stress relief employing the excitation signals synthesized by multiple frequencies. This multi-frequency coupled vibratory stress relief technology couples multiple frequencies and synthesizes an analog signal for vibratory stress relief treatment. That is to say, the synthesized analog signal contains multiple frequency information. However, when the component is treated by the vibratory stress relief under a signal synthesized by multiple frequencies, the vibration energy is distributed to the respective synthetic frequencies. In particular, the energy available at each frequency point is very limited when the number of frequencies employed is to synthesize the excitation signal. In this case, the effect of the multi-frequency coupled vibratory stress relief treatment on the component is not very satisfactory. Although adjusting the output energy of the exciter may increase the multi-frequency coupled vibration energy, change from such adjustment is ultimately limited, resulting in less energy at each frequency point. It is obvious that to design an exciter capable of outputting sufficiently high excitation energy to improve the effect of multi-frequency coupling vibratory stress relief would afford numerous advantages.

SUMMARY OF THE INVENTION

In view of the afore-mentioned reasons, in order to overcome the deficiencies in determining the excitation frequency of vibratory stress relief of the prior art sweeping frequency method, the present invention provides a system for determining excitation frequency of vibratory stress relief and a method thereof.

The system for determining the excitation frequency of vibratory stress relief comprises a host computer system, an arbitrary waveform generation card, a driver, a vibration exciter, an acceleration sensor, a charge amplifier, a data acquisition card, and a support device. The vibration exciter is mounted on the surface of the component, and the component is supported by the elastic support device; the excitation signal outputted by the arbitrary waveform generation card controlled by the host computer system is inputted to the vibration exciter via the driver, thereby driving the vibration exciter to generate vibration; the acceleration sensor is mounted on the component, the acceleration sensor is connected to the input port of the charge amplifier, the output port of the charge amplifier is connected to the input port of the data acquisition card, and the output port of the data acquisition card is connected to the host computer system.

The host computer system comprises a finite element numerical simulation module, a preferred excitation frequency determination module, a preferred excitation frequency reference voltage peak setting module, and an excitation signal synthesis module.

Further, the support device is an elastic element.

Further, the acceleration sensor is a piezoelectric acceleration sensor.

The method for determining the excitation frequency of vibratory stress relief comprises the following steps:

Step 1: connecting the vibration exciter and a component; the component is supported by a flexible support device for the vibration exciter to excite the component; connecting a signal line between the host computer system and the arbitrary waveform generation card, a signal line between the arbitrary waveform generation card and the driver, a signal line between the driver and the vibration exciter, a signal line between the acceleration sensor and the charge amplifier, a signal line between the charge amplifier and the data acquisition card, and a signal line between the data acquisition card and the host computer system; supplying power supply via the power source to the host computer system, the arbitrary waveform generation card, the driver, the vibration exciter, the charge amplifier, and the data acquisition card; and turning on a power source;

Step 2: starting the finite element software installed in the finite element numerical simulation module; the finite element software is employed to establish the 3D finite element model of the component, and the actual machining process of the component is simulated to obtain the surface residual stress distribution state of the component; numerical modal analysis of the component is carried out to obtain the natural frequencies of the component, the harmonic frequencies of various orders, and the vibration modes corresponding to the natural frequencies and harmonic frequencies for each of the various orders; determining a distribution region of peak vibration energy on each of the vibration modes; determining, via the preferred excitation frequency determination module, and according to the surface residual stress distribution state of the component, a vibration mode such that the distribution region of peak residual stress is consistent with a respective distribution region of peak vibration energy; wherein definition of consistent is defined as follows:

$$\frac{|Xpve - Xprs|}{Xprs} * 100\% \le 5\%,$$

wherein Xprs denoting the coordinate of the starting position of the distribution region of peak residual stress in the x-axis direction of the component, Xpve denoting the coordinate of the starting position of the distribution region of peak vibration energy in the x-axis direction of the component; a frequency corresponding to the vibration mode such that the distribution region of peak residual stress is consistent with the respective distribution region of peak vibration energy is selected as a preferred excitation frequency $f_i$ of vibratory stress relief, i=1, 2, ..., n, wherein n being a positive integer for the number of the preferred excitation frequencies;

Step 3: setting the reference voltage peaks Un for a group of sinusoidal signal with the frequencies of the preferred excitation frequencies in the preferred excitation frequency reference voltage peak setting module, i=1, 2, ..., n, wherein n is a positive integer and is the number of preferred excitation frequencies; the excitation signal employed for the vibratory stress relief treatment is obtained by synthesizing a group of the sinusoidal signals with the reference voltage peaks $U_{ri}$ in the excitation signal synthesis module; the synthesized excitation signal generated by the host computer system is converted into an analog excitation signal via the arbitrary waveform generation card; the analog excitation signal outputted by the arbitrary waveform generation card is input to the vibration exciter via the driver, thereby driving the vibration exciter to generate vibration;

Step 4: vibratory stress relief treatment of the component under the synthesized excitation signal Δt time, Δt being a positive number, at the same time, the vibration signal of the component collected by the acceleration sensor during the Δt period is converted into an analog voltage signal through the charge amplifier; the data acquisition card converts the collected analog voltage signal into a digital voltage signal; the host computer system acquires the digital voltage signal collected by the data acquisition card; the host computer system performs fast Fourier transform on the digital voltage signal to obtain the spectrum of the digital voltage signal; the host computer system obtains each actual voltage peak $U_{si}$ at a preferred group of excitation frequency points from the spectrum, i=1, 2, ..., n, wherein n is a positive integer and is the preferred number of excitation frequencies; calculating a difference $U_{ri}$–$U_{si}$ between the reference voltage peak $U_{ri}$ of each of the preferred excitation frequencies and the actual voltage peak $U_{si}$ of each of the preferred excitation frequencies, and storing the calculation results in the host computer system; selecting a frequency with a maximum difference of voltage peak as the excitation frequency of the vibratory stress relief treatment.

In a prior art vibratory stress relief process, the natural frequency or harmonic frequency value of the component before vibratory stress relief treatment is often selected as the excitation frequency, and the excitation frequency is constant during the vibratory stress relief treatment. However, the natural frequency value or harmonic frequency value of the component during the vibratory stress relief process will become smaller, resulting in larger difference between the excitation frequency value and the actual natural frequency value or between the excitation frequency value and the harmonic frequency value of the component. In such a scenario, the vibration effect of the component will deteriorate, resulting in smaller acceleration level acting on the component, that is, smaller vibration energy acting on the component, and hence reduced elimination effect for the residual stress. Therefore, in view of the afore-mentioned phenomenon generated during component vibratory stress relief treatment, the present invention selects the frequency with the maximum difference of voltage peak as the excitation frequency of the vibratory stress relief treatment from a group of preferred excitation frequencies, due to the fact that the maximum difference of voltage peak implies that the micro-defects of the component are most susceptible to change under the action of such an excitation frequency, that is, the residual stress elimination effect of the component is at its best. At the same time, the excitation frequency determining method of the present invention overcomes deficiency of the prior art in determining the excitation frequency of vibratory stress relief by means of the existing sweeping frequency method without considering the residual stress distribution state on the surface of the component. In addition, the excitation frequency determining method proposed by the present invention is more focused in determining the excitation frequency of the vibratory stress relief treatment, resulting in better efficiency of the entire excitation frequency determining process.

Further, the time Δt is 5 minutes.

Further, the voltage peak is employed to characterize a peak vibration energy acting on the component.

The sensitivity value of the acceleration sensor is s(pC/ms$^{-2}$), the sensitivity coefficient at the input port of the charge amplifier is S(pC/Unit), magnification coefficient is F(Unit/V), and then the conversion relationship between the acceleration vibration level and the voltage peak acting on the component is $$a = \frac{S \times F}{s} \times U (\text{ms}^{-2}),$$

wherein a is the acceleration level acting on the component and U is the voltage peak. Therefore, the voltage peak can be employed to characterize the vibration energy acting on the component, and using the voltage peak to characterize the vibration energy acting on the component can reduce the processing workload of the host computer system and improve the operating efficiency of the entire vibratory stress relief system.

Conception of the present invention is as follows: a host computer system, an arbitrary waveform generation card, a driver, a vibration exciter, an acceleration sensor, a charge amplifier, a data acquisition card, and a support device constitutes the system for determining the excitation frequency of vibratory stress relief. In determining the excitation frequency of vibratory stress relief, numerical simulation and Fourier transform techniques are employed to achieve an ideal vibratory stress relief effect on eliminating residual stress, by means of determining the vibration mode such that the distribution region of peak residual stress is consistent with the distribution region of peak vibration energy.

The beneficial effects of the present invention are as follows:

1. The system for determining the excitation frequency of vibratory stress relief proposed by the present invention determines the excitation frequency of vibratory stress relief via control of the host computer system, thus workload is reduced and work efficiency improved.

2. Determination of the excitation frequency for vibratory stress relief treatment of the component on the basis of obtaining the vibration mode of the component and the distribution state of the residual stress on the surface of the component by means of numerical simulation as adopted by the present invention is conducive to obtaining an ideal effect of vibratory stress relief for elimination of residual stress.

3. Determination of the excitation frequency of vibratory stress relief treatment from a group of preferred excitation frequencies by means of Fourier transform on the basis of determination of a group of preferred excitation frequencies by means of numerical simulation as adopted by the present invention overcomes deficiency of the prior art in determining the excitation frequency of vibratory stress relief by means of the existing sweeping frequency method without considering the residual stress distribution state on the surface of the component. Meanwhile, compared with the sweeping frequency method, the method for determining excitation frequency proposed by the present invention is more pertinent, and the whole process of determining excitation frequency is more efficient.

EMBODIMENTS

Figure 1:
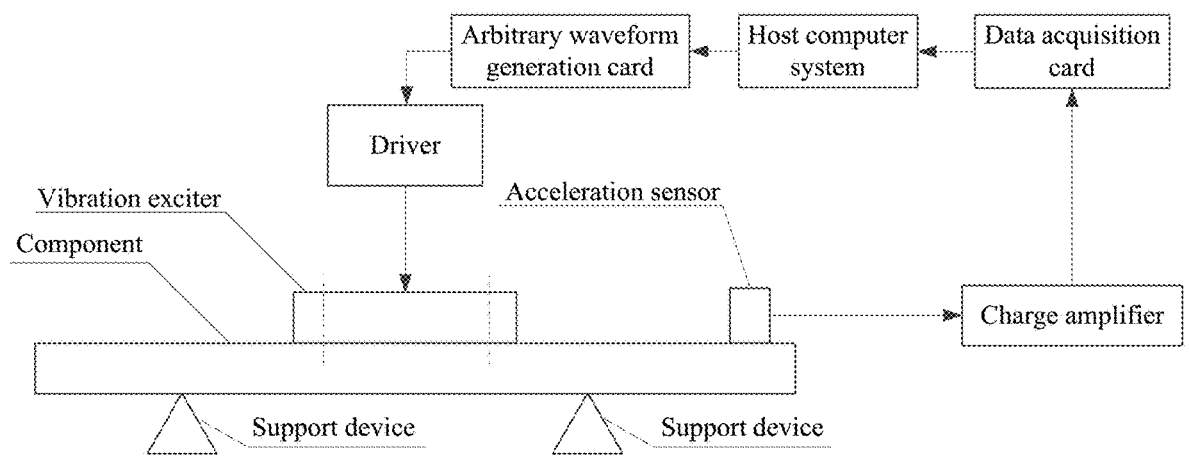
FIG. 1 is a system diagram for determining the excitation frequency of vibratory stress relief.

The present invention will be further described with reference to the accompanying drawings:

The system for determining the excitation frequency of vibratory stress relief comprises a host computer system, an arbitrary waveform generation card, a driver, a vibration exciter, an acceleration sensor, a charge amplifier, a data acquisition card, and a support device. The vibration exciter is mounted on the surface of the component, and the component is supported by the elastic support device; the excitation signal outputted by the arbitrary waveform generation card controlled by the host computer system is input to the vibration exciter via the driver, thereby driving the vibration exciter to generate vibration; the acceleration sensor is mounted on the component, the acceleration sensor is connected to the input port of the charge amplifier, the output port of the charge amplifier is connected to the input port of the data acquisition card, and the output port of the data acquisition card is connected to the host computer system.

The host computer system comprises a finite element numerical simulation module, a preferred excitation frequency determination module, a preferred excitation frequency reference voltage peak setting module, and an excitation signal synthesis module.

Further, the support device is an elastic element.

Further, the acceleration sensor is a piezoelectric acceleration sensor.

The method for determining the excitation frequency of vibratory stress relief comprises the following steps:

Step 1: connecting the vibration exciter and a component; the component is supported by a flexible support device for the vibration exciter to excite the component; connecting the signal line between the host computer system and the arbitrary waveform generation card, between the arbitrary waveform generation card and the driver, between the driver and the vibration exciter, between the acceleration sensor and the charge amplifier, between the charge amplifier and the data acquisition card, between the data acquisition card and the host computer system; supplying power supply via the power source to the host computer system, the arbitrary waveform generation card, the driver, the vibration exciter, the charge amplifier, and the data acquisition card; and turn on a power source;

Step 2: starting the finite element software installed in the finite element numerical simulation module; the finite element software is employed to establish the 3D finite element model of the component, and the actual machining process of the component is simulated to obtain the surface residual stress distribution state of the component; numerical modal analysis of the component is carried out to obtain the natural frequencies of the component, the harmonic frequencies of various orders, and the vibration modes corresponding to the natural frequencies and harmonic frequencies for each of the various orders; determining, via the preferred excitation frequency determination module, and according to the surface residual stress distribution state of the component, a vibration mode such that the distribution region of peak residual stress is consistent with a respective distribution region of peak vibration energy; wherein definition of consistent is defined as follows:

$$\frac{|Xpve - Xprs|}{Xprs} * 100\% \leq 5\%,$$

wherein Xprs denoting the coordinate of the starting position of the distribution region of peak residual stress in the x-axis direction of the component, Xpve denoting the coordinate of the starting position of the distribution region of peak vibration energy in the x-axis direction of the component; a frequency corresponding to the vibration mode such that the distribution region of peak residual stress is consistent with the respective distribution region of peak vibration energy is selected as a preferred excitation frequency $f_i$ of vibratory stress relief, i=1, 2, . . . , n, wherein n being a positive integer for the number of the preferred excitation frequencies.

Step 3: setting the reference voltage peaks $U_{ri}$ for a group of sinusoidal signal with the frequencies of the preferred excitation frequencies in the preferred excitation frequency reference voltage peak setting module, i=1, 2, . . . , n, wherein n is the positive integer for the number of the preferred excitation frequencies; the excitation signal employed for the vibratory stress relief treatment is obtained by synthesizing a group of the sinusoidal signals with the reference voltage peaks $U_{ri}$ in the excitation signal synthesis module; the synthesized excitation signal generated by the host computer system is converted into an analog excitation signal via the arbitrary waveform generation card; the analog excitation signal outputted by the arbitrary waveform generation card is input to the vibration exciter via the driver, thereby driving the vibration exciter to generate vibration.

Step 4: vibratory stress relief treatment of the component under the synthesized excitation signal Δt time, Δt being a positive number, at the same time, the vibration signal of the component collected by the acceleration sensor during the Δt period is converted into an analog voltage signal through the charge amplifier; the data acquisition card converts the collected analog voltage signal into a digital voltage signal; the host computer system acquires the digital voltage signal collected by the data acquisition card; the host computer system performs fast Fourier transform on the digital voltage signal to obtain the spectrum of the digital voltage signal; the host computer system obtains each actual voltage peak $U_{si}$ at a preferred group of excitation frequency points from the spectrum, i=1, 2, . . . , n, wherein n is a positive integer and is the preferred number of excitation frequencies; calculating a difference $U_{ri}-U_{si}$ between the reference voltage peak $U_{ri}$ of each of the preferred excitation frequencies and the actual voltage peak $U_{si}$ of each of the preferred excitation frequencies, and storing the calculation results in the host computer system; selecting a frequency with a maximum difference of voltage peak as the excitation frequency of the vibratory stress relief treatment.

Further, the finite element software is an ANSYS finite element software.

Figure 2:
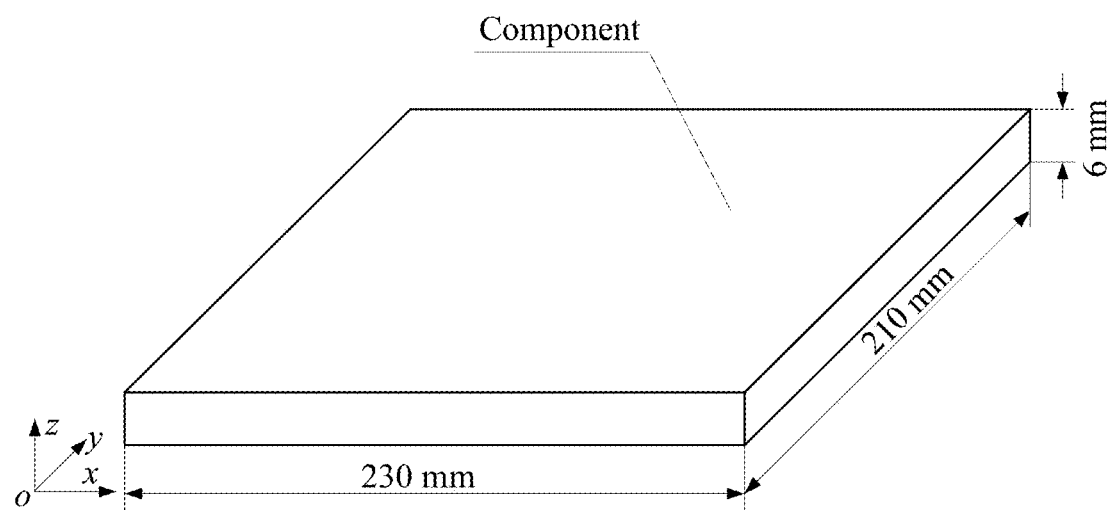
FIG. 2 is a schematic dimension diagram of the component whose excitation frequency of vibratory stress relief is to be determined.
Figure 3:
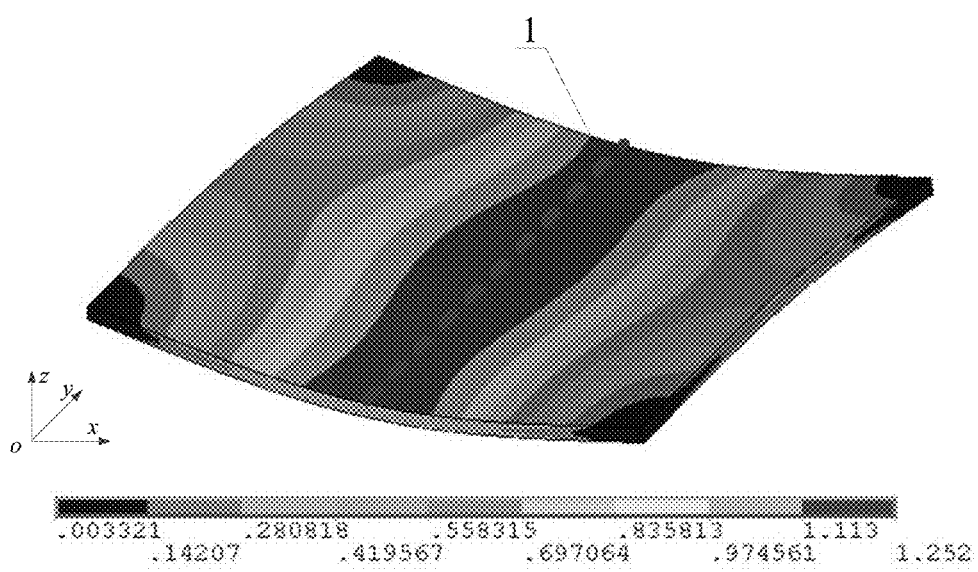
FIG. 3 is a schematic diagram showing vibration mode corresponding to natural frequency 571 Hz of the component.
Figure 4:
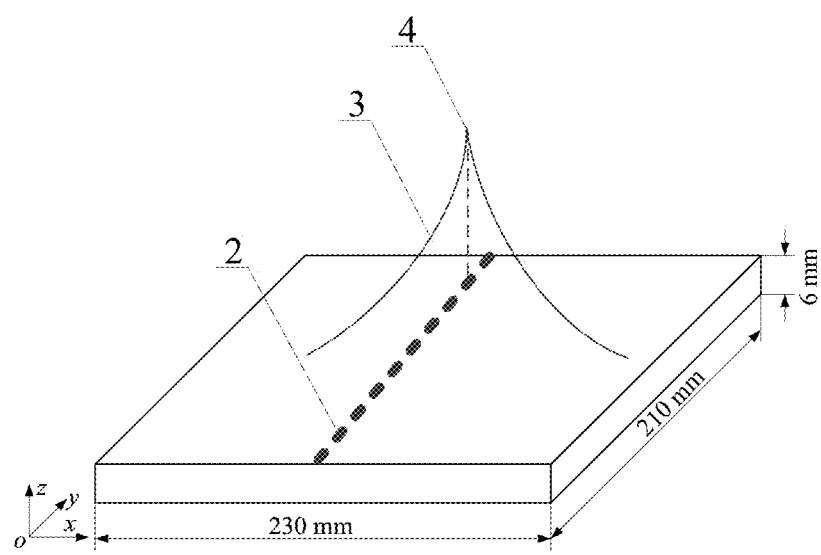
FIG. 4 is a schematic diagram showing surface residual stress distribution state of the component.
Figure 5:
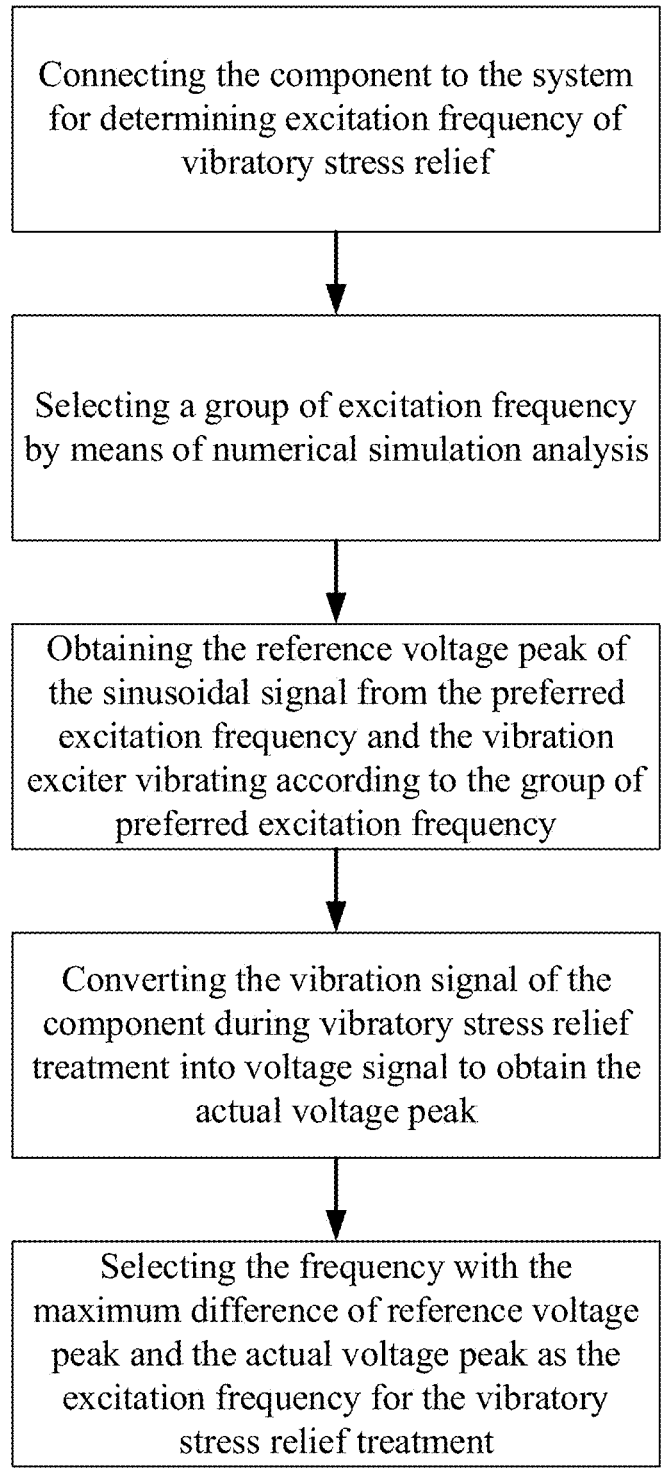
FIG. 5 is flow chat of a method for determining the excitation frequency of vibratory stress relief, employing the system for determining the excitation frequency of vibratory stress relief.

The process of determining the preferred excitation frequency is as follows: the component for numerical modal analysis is a 45# steel plate component with a length of 230 mm, a width of 210 mm and a thickness of 6 mm, as shown in FIG. 2. For the numerical modal analysis, the density, elastic modulus E and Poisson's ratio of 45# steel are required. The specific values are ρ=7850 kg/m³, E=200 GPa, and v=0.28, respectively. The 20-node SOLID95 unit is employed to mesh the component and establish a three-dimensional finite element model. Meshing the component by Volume Sweep, a regular grid can be obtained, and the accuracy of the solution can be further improved. The Blocking Lanczos method in the ANSYS modal analysis module is employed to solve the vibration modes and natural frequencies of the component. One of the vibration modes is shown in FIG. 3, with the corresponding natural frequency being 571 Hz. The numerals 0.003321, 0.14207, 0.280818, 0.419567, 0.558315, 0.697064, 0.835813, 0.974561, 1.113, and 1.252 shown on the bar in the lower part of the FIG. 3 respectively represent the strain corresponding to the regions of vibration energy of the component on the upper part. The region corresponding to the position 1 of peak vibration energy as represented by the coordinate Xpve along the x-axis corresponds to the strain 1.252. The distribution region of peak vibration energy can be obtained according to the vibration mode of the component, and the position 1 of peak vibration energy, that is, the starting position of the distribution region of peak vibration energy in the x-axis direction, can be defined by the coordinate Xpve along the x-axis. Taking laser processing as an example, the laser surface processing is performed along the y-axis direction in FIG. 4. The laser surface processing path 2 is shown in FIG. 4, and the residual stress distribution curve 3 is shown in FIG. 4. The distribution region of peak residual stress can be obtained, and the position 4 of the peak residual stress, that is, the starting position of the distribution region of peak residual stress in the x-axis direction, can be defined by the coordinate Xprs along the x-axis. When $$\frac{|Xpve - Xprs|}{Xprs} * 100\% \le 5\%,$$

it is defined that the peak vibration energy distribution region is consistent with the peak residual stress distribution region, and the frequency corresponding to the vibration mode is the preferred excitation frequency.

It is to be noted that positions other than the starting position of the distribution region of peak vibration energy, so long as they characterize the distribution region of peak vibration energy, may be chosen to represent the position 1 of peak vibration energy. Examples are: ending position of the distribution region of peak vibration energy, or mid-point of the distribution region of peak vibration energy. The same applies for the position 4 of peak residual stress. That is, positions other than the starting position of the distribution region of peak residual stress, so long as they characterize the distribution region of peak residual stress, may be chosen to represent the position 4 of peak residual stress. Examples are: ending position of the distribution region of peak residual stress, or mid-point of the distribution region of peak residual stress.

In a prior art vibratory stress relief process, the natural frequency or harmonic frequency value of the component before vibratory stress relief treatment is often selected as the excitation frequency, and the excitation frequency is constant during the vibratory stress relief treatment. However, the natural frequency value or harmonic frequency value of the component during the vibratory stress relief process will become smaller, resulting in larger difference between the excitation frequency value and the actual natural frequency value or between the excitation frequency value and the harmonic frequency value of the component. In such a scenario, the vibration effect of the component will deteriorate, resulting in smaller acceleration level acting on the component, that is, smaller vibration energy acting on the component, and hence reduced elimination effect for the residual stress. Therefore, in view of the afore-mentioned phenomenon generated during component vibratory stress relief treatment, the present invention selects the frequency with the maximum difference of voltage peak as the excitation frequency of the vibratory stress relief treatment from a group of preferred excitation frequencies, due to the fact that the maximum difference of voltage peak implies that the micro-defects of the component are most susceptible to change under the action of such an excitation frequency, that is, the residual stress elimination effect of the component is at its best. At the same time, the excitation frequency determining method of the present invention overcomes deficiency of the prior art in determining the excitation frequency of vibratory stress relief by means of the existing sweeping frequency method without considering the residual stress distribution state on the surface of the component. In addition, the excitation frequency determining method proposed by the present invention is more focused in determining the excitation frequency of the vibratory stress relief treatment, resulting in better efficiency of the entire excitation frequency determining process.

Further, the time Δt is 5 minutes.

Further, the voltage peak is employed to characterize a peak vibration energy acting on the component.

The sensitivity value of the acceleration sensor is s(pC/ms$^{-2}$), the sensitivity coefficient at the input port of the charge amplifier is S(pC/Unit), magnification coefficient is F(Unit/V), and then the conversion relationship between the acceleration vibration level and the voltage peak acting on the component is $$a = \frac{S \times F}{s} \times U (\text{ms}^{-2}),$$

wherein a is the acceleration level acting on the component and U is the voltage peak. Therefore, the voltage peak can be employed to characterize the vibration energy acting on the component, and using the voltage peak to characterize the vibration energy acting on the component can reduce the processing workload of the host computer system and improve the operating efficiency of the entire vibratory stress relief system.

Description of the embodiments of the present specification is merely an enumeration of the implementation forms of the inventive concept of the present invention, which shall not be construed as limiting the scope of the present invention to the specific forms expressed in the embodiments. Equivalent technical solutions that a skilled person of the art may construct from the conception of the present invention shall fall under the scope of the present invention.

The invention claimed is:

1. A method for determining excitation frequency of vibratory stress relief employing a system for determining excitation frequency of vibratory stress relief, the system for determining excitation frequency of vibratory stress relief comprising a host computer system, an arbitrary waveform generation card, a driver, a vibration exciter, an acceleration sensor, a charge amplifier, a data acquisition card, and a support device, wherein:

the vibration exciter is mounted on a surface of a component, and the component is supported by the support device;

an excitation signal outputted by the arbitrary waveform generation card controlled by the host computer system is inputted to the vibration exciter via the driver, thereby driving the vibration exciter to generate vibration;

the acceleration sensor is mounted on the component, the acceleration sensor is connected to an input port of the charge amplifier, an output port of the charge amplifier is connected to an input port of the data acquisition card, and an output port of the data acquisition card is connected to the host computer system; and the host computer system comprises a finite element numerical simulation module, a preferred excitation frequency determination module, a preferred excitation frequency reference voltage peak setting module, and an excitation signal synthesis module; and wherein the method for determining the excitation frequency of vibratory stress relief comprises the following steps:

Step 1:
connecting the vibration exciter with the component, the component being supported by the support device for the vibration exciter to excite the component;

connecting a signal line between the host computer system and the arbitrary waveform generation card, a signal line between the arbitrary waveform generation card and the driver, a signal line between the driver and the vibration exciter, a signal line between the acceleration sensor and the charge amplifier, a signal line between the charge amplifier and the data acquisition card, and a signal line between the data acquisition card and the host computer system;

turning on a power source; and supplying power supply via the power source to the host computer system, the arbitrary waveform generation card, the driver, the vibration exciter, the charge amplifier, and the data acquisition card;

Step 2:
starting a finite element software installed in the finite element numerical simulation module;

employing the finite element software to establish a 3D finite element model of the component, and simulating an actual machining process of the component to obtain a surface residual stress distribution state of the component, thereby obtaining a distribution region of peak residual stress;

carrying out numerical modal analysis of the component to obtain natural frequencies and harmonic frequencies of the component for each of various orders, and vibration modes corresponding to the natural frequencies and the harmonic frequencies for each of the various orders;

determining a distribution region of peak vibration energy on each of the vibration modes; and determining, via the preferred excitation frequency determination module, and according to the surface residual stress distribution state of the component, a vibration mode such that the distribution region of peak residual stress is consistent with a respective distribution region of peak vibration energy, with a criterion as follows:

$$\frac{|Xpve - Xprs|}{Xprs} * 100\% \leq 5\%,$$

$X_{prs}$ denoting a coordinate of a starting position of the distribution region of peak residual stress in an x-axis direction of the component, $X_{pve}$ denoting a coordinate of a starting position of the distribution region of peak vibration energy in the x-axis direction of the component, and a frequency corresponding to the vibration mode such that the distribution region of peak residual stress is consistent with the respective distribution region of peak vibration energy being a preferred excitation frequency $f_i$ of vibratory stress relief, i=1, 2, . . . , n, n being a positive integer for a number of preferred excitation frequencies;

Step 3:
setting reference voltage peaks $U_{ri}$ for a group of sinusoidal signals with the preferred excitation frequencies in the preferred excitation frequency reference voltage peak setting module, i=1, 2, . . . , n;

synthesizing the group of the sinusoidal signals with the reference voltage peaks $U_{ri}$, via the excitation signal synthesis module to be an excitation signal for vibratory stress relief treatment;

converting the synthesized excitation signal generated by the host computer system into an analog excitation signal via the arbitrary waveform generation card; and inputting the analog excitation signal outputted by the arbitrary waveform generation card to the vibration exciter via the driver, thereby driving the vibration exciter to generate vibration; and Step 4:

conducting the vibratory stress relief treatment of the component under the synthesized excitation signal for $\Delta t$ time, $\Delta t$ being a positive number, and at the same time, converting a vibration signal of the component collected by the acceleration sensor during the $\Delta t$ time into an analog voltage signal via the charge amplifier;

converting the analog voltage signal into a digital voltage signal via the data acquisition card;

acquiring the digital voltage signal outputted by the data acquisition card via the host computer system;

performing fast Fourier transform on the digital voltage signal via the host computer system to obtain a spectrum of the digital voltage signal;

obtaining, via the host computer system, each actual voltage peak $U_{si}$, at a preferred group of excitation frequency points from the spectrum, i=1, 2, ..., n;

calculating a difference $U_{ri} - U_{si}$ between the reference voltage peak $U_{ri}$ of each of the preferred excitation frequencies and the actual voltage peak $U_{si}$ of each of the preferred excitation frequencies, and storing calculation results in the host computer system; and selecting a frequency with a maximum difference of voltage peak as the excitation frequency for the vibratory stress relief treatment.

2. The method according to claim 1, wherein the time $\Delta t$ is 5 minutes.

3. The method according to claim 1, wherein the voltage peak characterizes a peak vibration energy acting on the component.

* * * * *